United States Patent [19]

Arai et al.

[11] 3,937,105

[45] Feb. 10, 1976

[54] AUTOMATIC TRANSMISSION SYSTEM FOR USE WITH AUTOMOBILES

[75] Inventors: Hiroshi Arai; Yutaka Taga, both of Toyota, Japan

[73] Assignee: Toyoto Jidosha Kogyo Kabushiki Kaisha, Japan

[22] Filed: Aug. 8, 1974

[21] Appl. No.: 495,915

[30] Foreign Application Priority Data
Aug. 29, 1973 Japan.................. 48-96931

[52] U.S. Cl. ............... 74/846; 192/4 A; 74/866
[51] Int. Cl................... B60k 21/00; F16h 3/74
[58] Field of Search ......... 74/866, 869, 752 D, 846; 192/4 A

[56] References Cited
UNITED STATES PATENTS

| | | | |
|---|---|---|---|
| 3,625,080 | 12/1971 | Rachel et al..................... | 74/866 X |
| 3,682,014 | 8/1972 | Magg et al....................... | 74/866 X |
| 3,714,849 | 2/1973 | Smith................................ | 74/869 |
| 3,726,157 | 4/1973 | Marumo........................... | 74/866 X |
| 3,805,640 | 4/1974 | Schneider et al................. | 74/866 X |

*Primary Examiner*—Samuel Scott
*Assistant Examiner*—P. S. Lall
*Attorney, Agent, or Firm*—Stewart and Kolasch, Ltd.

[57] ABSTRACT

An automatic transmission system for use with automobiles comprising a gear wheel transmission mechanism, a hydraulic control circuit and an electric computing circuit, said gear wheel transmission mechanism being changed over by said hydraulic circuit under the control of said computing circuit, wherein said computing circuit selects the changing-over conditions of the transmission system in response to the driver's will, as well as the automobile running conditions and automatically establishes a parking condition when the automobile is to be parked, and ensures protection when a malfunction has occured in said hydraulic circuit or said computing circuit.

5 Claims, 14 Drawing Figures

AUTOMATIC TRANSMISSION SYSTEM FOR USE WITH AUTOMOBILES

BACKGROUND OF THE INVENTION

1. Field of the Invention

This invention relates to an automatic transmission system for use with automobiles, and more particularly, an automatic transmission system to control automatically the operation of a transmission gear in relation to the operational conditions of an automobile, including its running as well as parking condition. Transmission include a gear wheel system and an engaging means to make the gear wheels engage selectively with one another.

2. Description of the Prior Art

In the conventional automatic automobile transmission systems, the engaging means is generally operated by hydraulic pressure to effect the changing-over operations of the transmission system. However, such hydraulic systems make the whole control system complicated and are unable to give a transmission system an advantageous optimum operating condition. To solve the aforementioned problem, it has been proposed to employ a combination of electric and hydraulic systems, as disclosed in Japanese Patent Publication Nos. 36284/72, 210/73 and 211/73. In such a system, the hydraulic system is made simpler but still requires mechanical linkage to set the forward, reverse, parking and nutral transmission positions. The linkage operates manual valves provided in the control system of the transmission and requires relatively high accuracy for its positioning. However, since the transmission inevitably changes its relative position in the body during the running of the automobile, a linkage which allows for a relative movement between the body and the transmission is necessary. Said linkage must also provide precise movement and is complicated and difficult to design. Furthermore, when this type of transmission is mounted in a different type of body, the design of the linkage must be altered to suit the body. Moreover, since the parking brake provided in the conventional automatic transmission system is of a manual type operable with a mechanical linkage, it is also bound with the aforementioned drawbacks and, in addition, it is difficult to release the parking brake when the automobile is parked on a steep slope because a large force is required to manipulate the handle and release the brake. Furthermore, since it can be said that some drivers fail to shift the gear lever into the parking position when parking the automobile, there is always the danger that the automobile might inadvertently start to move by itself.

SUMMARY OF THE INVENTION

Therefore, it is a primary object of this invention to solve the aforementioned problems in the conventional automatic automobile transmission systems and to provide an automatic automobile transmission system which permits the mechanical connection between a transmission and a shift lever to be abolished and replaced with an electrical connection.

Another object of this invention is to incorporate an electrical computing circuit in said electric connection to replace the mechanical connection between the transmission and the gear shift lever, and to control the transmission in consideration of the running conditions of the automobile as well as the driver's will through a computing process by use of a computing circuit.

Another object is to control the operation of the transmission according to the output of said computing circuit by way of solenoid valve mechanisms and hydraulic circuits.

A further object is to set the transmission automatically to the parking conditions by utilizing said computing circuit to detect and engine stopping operation by way of the OFF or ON position of the ignition switch.

A still further object is to detect malfunctions of said solenoid valve mechanisms and to ensure protection by means of said computing circuit.

Other objects and advantages of this invention will become apparent from the descriptions of preferred embodiments set forth hereinunder with reference to the accompanying drawing.

BRIEF DESCRIPTION OF THE DRAWING

In the accompanying drawing,

FIGS. 2a and 2b are diagrammatic sectional views showing an embodiment of the transmission gear incorporated in the automatic transmission system according to this invention, wherein FIG. 2b is a section on an enlarged scale of a part of the structure shown in FIG. 2a;

DESCRIPTION OF THE PREFERRED EMBODIMENT

Figure 1:
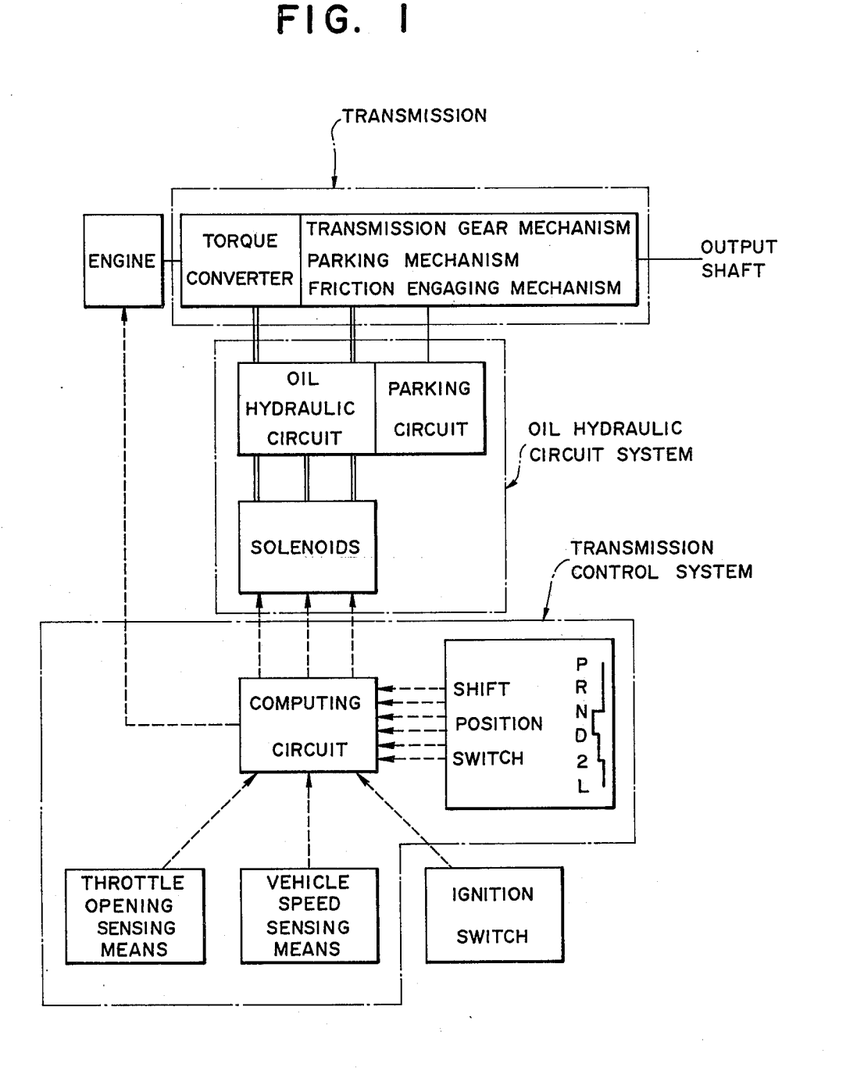
FIG. 1 is a diagrammatical view showing the general construction of the automatic transmission system according to this invention.

As shown in FIG. 1, the automatic transmission system according to this invention is composed of three structural elements. In more detail, the first structural element is a transmission control system to compute changing-over points according to the automobile running speed, throttle opening, shift position, etc., and to despatch instructions regarding energization (ON) or de-energization (OFF) of the solenoids. The second structural element is a hydraulic circuit system including change-over valves to bring about a change-over of oil passages by means of the solenoids according to the instructions received from said transmission control system, a hydraulic pressure source for actuating friction engaging means, a parking circuit,. etc. The third structural element is a transmission including a fluid type converter coupling, a transmission gear wheel meshing mechanism, a friction engaging mechanism etc.

In the following, each system will be described in detail.

I. Transmission

Figure 2A:
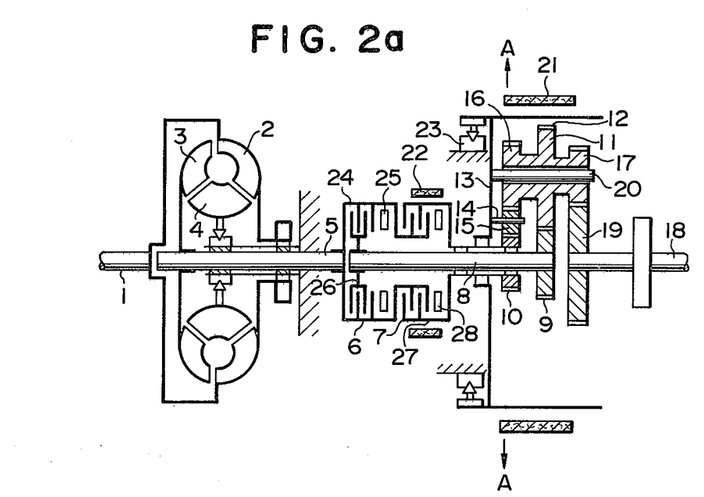
Figure 2B:
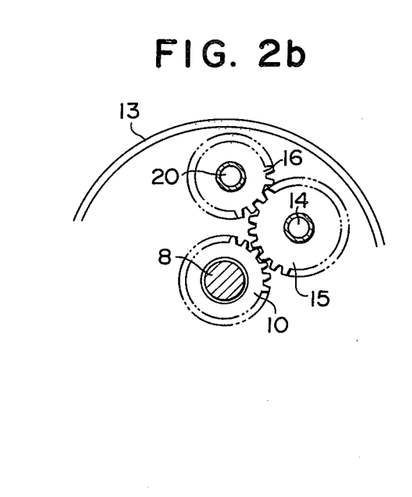

For the transmission, an exemplarly description is shown in FIGS. 2a and 2b which provide a typical example of an automatic transmission equipped with a torque converter and adapted for the changing-over, including three stage forward and one stage reverse. A pump impeller is directly connected to the engine crank shaft 1, and the engine output power is transmitted from the pump impeller 2 to a turbine runner 3 by way of oil, said oil being returned to the pump rotor 2 by being guided by stator 4. By the continuous circulation of oil in the abovementioned manner, a rotational power is continuously obtained for a turbine shaft 5. Such a rotational output power of the turbine shaft 5 is transmitted to a gear wheel type transmission device incorporated with a torque converter so that a transmission action including three stage forward and one stage reverse is effected by the controlling multi-disc clutch means 6, 7 and brake band means 21, 22, said transmission action being automatically effected by a hydraulic servo system as it is conventionally known.

The constitution of the gear wheel transmission device mounted to follow the torque converter will be described hereinunder.

The turbine 3 is directly connected to the turbine shaft 5 which constitutes an input shaft of a planetary gear mechanism. The turbine shaft 5 is connected to a drum 24 by means of a spline engagement to form a co-rotational member. Within the drum 24, the multi-disc clutch 6 (hereinunder called front clutch) is mounted and adapted to operate in the on (actuation) and off (release) manner by being actuated by pistons 25 by means of back springs, said pistons being actuated by the hydraulic pressure in the system. The clutch plates of the front clutch 5 are integrally connected to the drum 24 at their outer peripheral portions by means of splines, while clutch discs are mounted to a hub 26 by splines. The hub 26 is integrally connected to an intermediate shaft 8 by means of splines. The front clutch drum 24 carries clutch discs for a second multi-disc clutch 7 (hereinunder called rear clutch) to form a co-rotational member therewith by means of splines. The clutch plates of the rear clutch 7 are integrally connected to a clutch drum 27 at their outer peripheral portions by means of splines. The rear clutch 7 is put on and off by means of pistons 28.

The intermediate shaft 8 connected integrally with the hub 26 of the front clutch 6 carries an integral input sun gear 9 at its rear end. The rear clutch drum 27 forms a unitary member together with a reverse sun gear 10 by being connected therewith by proper relative rotation checking means. The input sun gear 9 meshes with a gear 12 of a pinion 11 thereby forming a planetary gear train which, although only one is shown in FIG. 2a, may preferably be provided in plurality, i.e. two or three around the input sun gear 9. The reverse sun gear 10 meshes with an idler gear 15 rotatably carried by a pin 14 mounted to a carrier 13, said idler 15 in turn meshes with a gear 16 of the pinion 11.

A gear 17 located at the rear end of the pinion 11 meshes with a gear 19 carried by an output shaft 18 of the transmission. The pinion 11 having the gears 16 12 and 17 is carried by a pinion pin 12 which in turn is carried by the carrier 13. The carrier 13 is provided with a band 21 (hereinunder called rear brake band) and is held stationary or released to rotate freely by the rear brake band 21 being actuated or released. In the same manner, a band 22 (hereinunder called front brake band) is provided around the rear clutch drum 27, whereby the drum 27 or the sun gear 10 can be held stationary or released by actuating or releasing the front brake band 22.

A one way clutch 23 mounted within the carrier 13 effects the same function as the rear brake band 21 in the forward low gear running condition.

II. Hydraulic Circuit

Figure 3A:
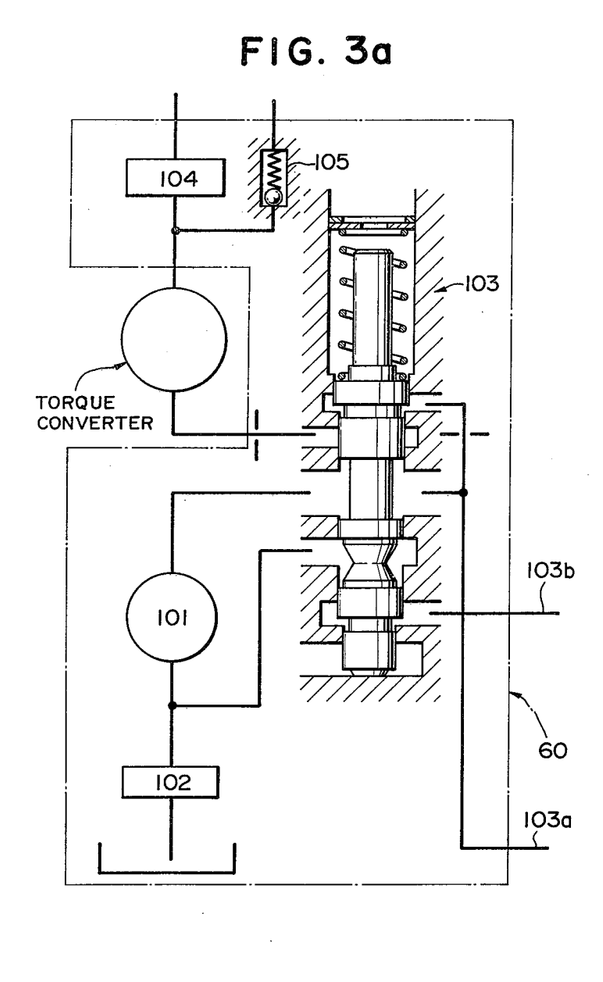
FIGS. 3a, 3b and 3c are diagrams showing an embodiment of the hydraulic control circuits incorporated in the automatic transmission system according to this invention.
Figure 3B:
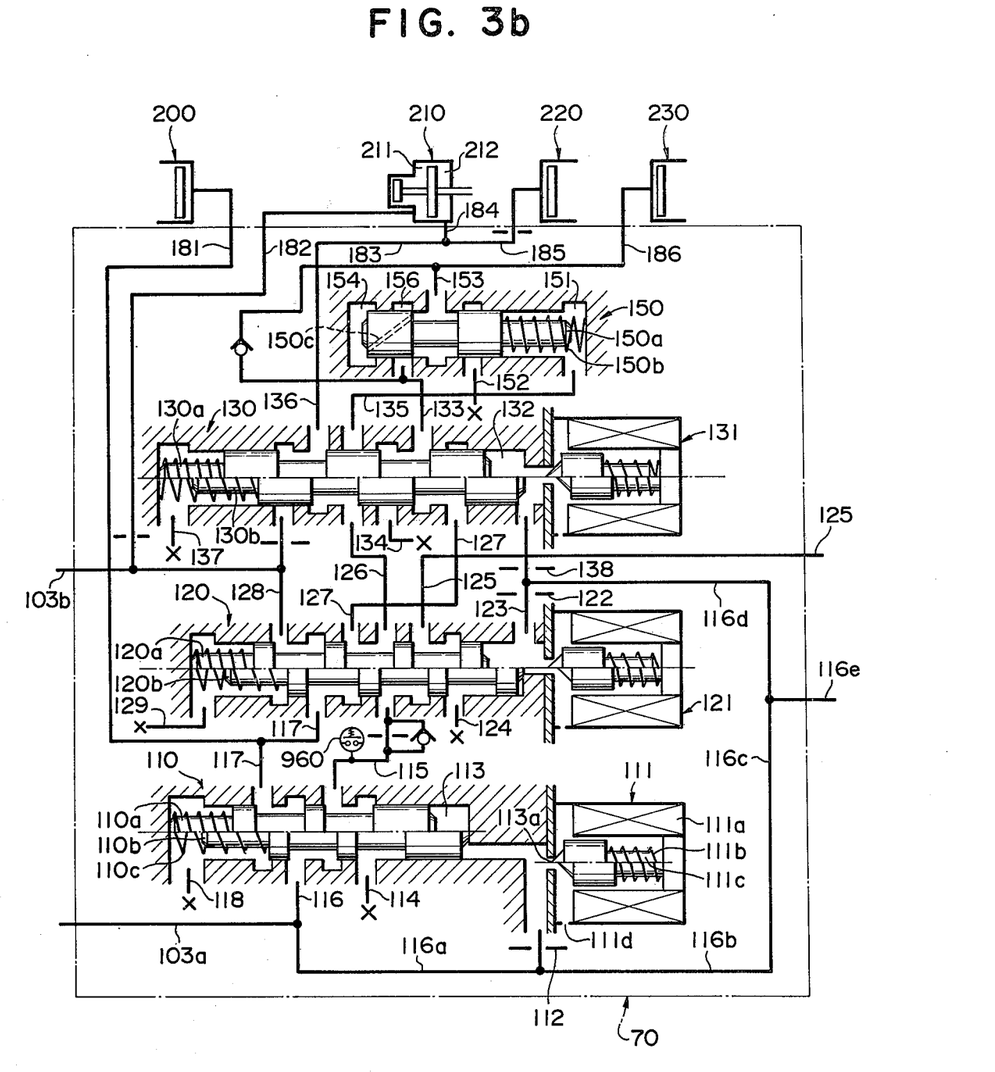
Figure 3C:
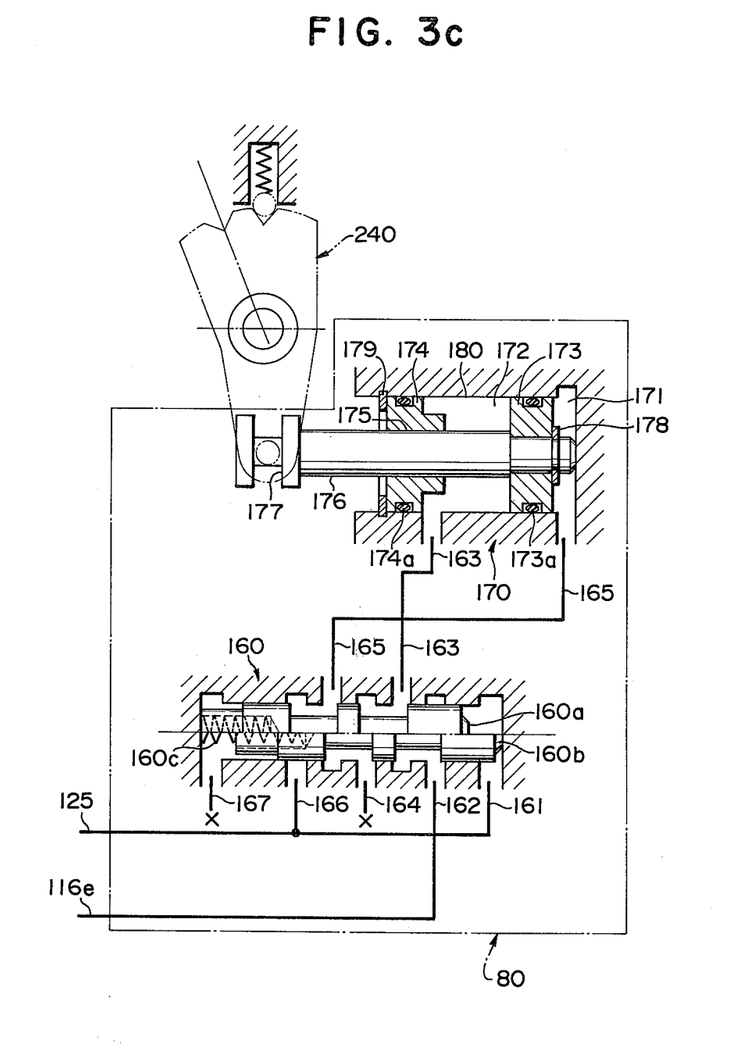

Details of the hydraulic circuit will now be described with reference to FIGS. 3a, 3b, and 3c.

Roughly divided, the hydraulic circuit is composed of a hydraulic pressure source 60, an operating circuit 70 and a parking circuit 80.

The hydraulic pressure source 60 is composed of oil pump 101, oil strainer 102, pressure regulating valve mechanism 103, oil cooler 104 and check valve 105. The hydraulic pressure source 60 operates to supply operating oil to the torque converter and lubricating oil to the gears and bearing means, as well as supplying pressurized oil to the hydraulic operating circuit 70. The oil controlled of its pressure (called line pressure) by the pressure adjusting valve mechanism 103 is supplied to the operating circuit 70 by a passage 103a.

The operating circuit 70 is composed of forward-/reverse change-over valve mechanism 110, solenoid 111 for the forward/reverse change-over valve, 1–2 speed shift valve mechanism 120, solenoid 121 for the 1–2 speed shift valve, 2–3 speed shift valve mechanism 130, solenoid 131 for the 2–3 speed shift valve and low coast pressure modulating valve mechanism 150. The valve body of each said valve mechanism moves rightward when each said solenoid is energized, and is moved leftward when the solenoid is not energized.

The line pressure from the passage 103a is passed through a constricting means 112 and is supplied into an oil chamber 113 of the forward/reverse shift valve mechanism. In the same manner, the line pressure from 103a is passed through oil passages 116a, 116b, 116c and 116d wherein it is supplied to an oil chamber 123 of the 1–2 speed shift valve mechanism by way of a constricting means 122, and to an oil chamber 132 of the 2–3 speed shift valve mechanism by way of constricting means 138.

The oil controlled of its pressure by the pressure adjusting valve mechanism 103 is passed through the passages 103a and 116 and introduced into the forward/reverse shift valve mechanism 110 and switched over according to energization or de-energization of the solenoid 111 either to an oil passage 117 (when the solenoid is not energized) or to an oil passage 115 (when the solenoid is energized). In the oil passage 115 an oil switch 960 is provided and is opened or closed depending on whether or not the system is in the forward condition.

The oil passage 117 is connected with the front clutch 200 by way of an oil passage 181 and is also connected to either an oil passage 127 or 128 according to energization or de-energization of the solenoid 121. The passage 128 is connected with the passage 103b, whereby, the oil pressure is communicated to the pressure adjusting valve mechanism 103 to lower the line pressure.

The passage 128 is also connected with the passage 182 and serves to supply pressure to an oil chamber 211 to actuate the front brake. The passage 115 communicates to either passages 126, 125 or passages 126, 127 according to energization or de-energization of the solenoid 121 respectively.

The oil passages 127 and 126 are connected to the 2–3 speed shift valve while the passage 125 is connected to oil passages 166 and 161 of the parking shift valve 160. According to the energization or de-energization of the solenoid 131, the passage 128 is closed or communicates to a passage 136, while the passage 126 communicates to both passages 136 and 135 or only to passage 135. The oil passage 127 is also controlled to communicate with a passage 133 or to be closed according to the energization or de-energization of the same solenoid.

The oil passage 136 communicates to an oil chamber 212 of the front brake 210 by way of oil passages 183 and 184. The passage 183 is, on the other hand, communicated to the rear clutch 220 by way of an oil passage 185.

The oil passage 133 communicates with an oil groove 156 of the low coast pressure modifying valve mechanism 150, and the adjusted pressure is supplied to the rear brake 230 by way of oil passages 153 and 186.

The oil passage 135 is connected to an oil chamber 151 of the low coast pressure modifying valve mechanism 150.

The parking circuit is composed of a parking shift valve mechanism 160 and a parking piston mechanism 170. A parking piston 173 is slidable in a bore 180 formed in the valve body under the sealing effect provided by an O-ring 173a. A piston rod 176 is mounted to the parking piston 173 by a snap ring 178 to form an integrally movable member with the piston 173. An axial end of the bore 180 is closed by a piston stopper 174 which keeps a sealing contact with the wall of the bore by an O-ring 174a and is held by a snap ring 179. The parking piston rod 176 is slidably passed through a central opening 175 of the stopper 174. A tip portion 177 of the parking rod 176 is formed in a groove to engage with the parking mechanism.

Oil is supplied to the parking shift valve mechanism 160 through the oil passage 125 or 116e. Depending on the rightward or leftward shift of the valve 160, an oil passage 166 is closed or communicates to an oil passage 165 while an oil passage 162 communicates to an oil passage 163 or closed resepectively.

The oil passage 165 communicates with an oil chamber 171 of the parking piston mechanism 170 while the oil passage 163 communicates with an oil chamber 172 of the same mechanism.

The operation of the automatic transmission system according to this invention will be described hereinunder with respect to each part thereof.

I. Transmission

The transmission having the constitution as described above operates as follows;

1st Speed:

The front clutch 6 and the rear brake band 21 are actuated. However, when the driving is made from the engine side, the one way clutch 23 operates even if the rear brake band is not actuated, effecting the same result. Therefore, when the one way clutch 23 is provided, the rear brake band 21 need not be actuated in this operation. However, in this case, it is not effected to transmit a power reversely from the output shaft. In such a first speed operation, the rotation of the turbine shaft 5 is directly transmitted to the input sun gear 9 by way of the front clutch 6. Since the carrier 13 is held stationary by the rear brake band 21, the pinion pin 20 is also held stationary and, therefore, the input rotation of the gear 9 is transmitted through the gears 12 and 17 to the gear 19 of the output shaft in the normal gear train driving manner.

2nd Speed:

Leaving the front clutch 6 in its actuating condition the rear brake band 21 is now released and the front brake band 22 is actuated. The turbine shaft 5 and the input sun gear 9 are then co-rotated as a unitary body while the clutch drum 27 and, accordingly, the reverse sun gear 10 are held stationary by the front brake band 22. In this condition, the rotation of the turbine shaft 5 is transmitted to the input sun gear 9 which drives the pinion 11 in the rotational direction (anti-clockwise) as opposed to the rotational direction (clockwise) of the turbine shaft 5. Such an action intends to rotate the gear 15 clockwise by way of the gear 16. However, since the gear 10 meshing with the gear 15 is held stationary, the pinion pin 14 revolves clockwise around the gear 10. This revolution of the pinion pin around the gear 10 is added to the revolution of the input sun gear 9 and the output gear 19. Since the number of teeth on gear 12 is larger than that on gear 17, the revolution adding ratio to the input sun gear 9 is larger than that added to the output gear 19 and, therefore, the rotational speed of the intermediate shaft 8 becomes higher than that of the output shaft 18. In other words, a reduction of the rotational speed is effected by the transmission.

3rd Speed:

The front and rear clutches are both actuated. In this case, the input sun gear 9 and the reverse sun gear 10 rotate as a unitary body and, therefore, the planetary gear system does not operate and rotate as a whole together with both sun gears. Therefore, the output shaft 18 has the same rotation as the turbine shaft 5.

Reversing:

The rear clutch 7 and the rear brake band 21 are actuated. The carrier 13 and, accordingly, the pinion pins 14 and 20 are then held stationary and, therefore, the rotation of the turbine shaft 5 is transmitted to the reverse sun gear 10 by way of the rear clutch 7, and furthermore, by way of the gears 15, 16 and 17, to the gear 19 of the output shaft 18, the last one being driven in the opposite direction.

II. Hydraulic Circuit

The operation of the hydraulic circuit will be explained hereunder.

The oil delivered from the oil pump 101 is controlled of its pressure so that it is held constant by the pressure adjusting mechanism 103 having a conventional structure, and is fed through the oil passage 103a to the operating circuit 70. The passage 103a communicates with the oil chamber 113 located at a right end portion of the forward/reverse change-over valve mechanism 110 by way of the oil passage 116a and the constricting means 112 and, therefore, the pressure in the passage 103a (line pressure) is applied to the oil chamber 113. On the other hand, when the coil 111a of the solenoid 111 is supplied with current, the plunger 111c is moved rightward by the electro-magnetic force generated by the coil 111a by conquering the spring 111c, whereby an oil exhausting port 113a of the oil chamber 113 is opened. The oil exhausting port 113a communicates with an oil exhausting port 111d of the solenoid 111, and the oil is exhausted through the oil exhausting port 111d. Therefore, the valve body of the forward/reverse shift valve 110 is moved to the position shown by 110b under the application of the force of spring 110c.

When the solenoid 111 is not energized, the plunger 111c is moved leftward by being urged by the spring 111b to close the oil exhausting port 113a of the oil chamber 113. In this condition an oil pressure can be established in the oil chamber 113, and when the oil pressure has become high enough to overcome the force of the spring 110c, the valve body is moved leftward to take the position as shown by 110a. The oil passage 103a communicates with the oil chamber 123 of the 1–2 speed shift valve mechanism as well as the oil chamber 132 of the 2–3 speed shift valve mechanism by way of the oil passages 116a, 116b, and 116c, 116d and the oil pressure applied to these oil chambers operates in the same manner as in the case of the forward-/reverse shift valve mechanism according to energization or de-energization of the solenoids 121 and 131 so as to cause rightward or leftward movement of the valve body to change-over the oil passages.

The energization or de-energization of the solenoids according to the operation conditions of the transmission are shown in the following table. The table also shows the operational conditions of the respective friction engaging means.

|  | Solenoid 111 | Solenoid 121 | Solenoid 131 | F/C200 | R/C220 | F/B210 | R/B230 |
|---|---|---|---|---|---|---|---|
| P | O | O | X | X | X | X | X |
| R | O | X | O | X | O | X | O |
| N | O | X | X | X | X | X | X |
| D 1st | X | O | X | O | X | X | X |
| 2nd | X | X | O | O | X | O | X |
| 3rd | X | X | X | O | O | X | X |
| L 1st | X | O | O | O | X | X | O |
| 2nd | X | X | O | O | X | O | X |

O...Solenoid is ON or brake/clutch is actuated
X...Solenoid is OFF or brake/clutch is released D Range 1st Speed Condition:

The solenoid 111 is not energized and the forward-/reverse shift valve is in its position as designated by 110a. In this condition, the oil passage 113a communicates with the oil passages 116, 117 and 181. Therefore, the oil pressure in the passage 103a operates the forwarding clutch 200.

The solenoid 121 is energized and therefore, the 1–2 speed shift valve is in the position of 120b, while the solenoid 131 is not energized and therefore, the 2–3 speed shift valve is in the position 130a. In this condition, although the oil passage 117 communicates with the oil passage 127, the oil pressure is applied only to the forwarding clutch since the passage is blocked by the 2–3 speed shift valve.

D Range 2nd Operation Condition:

Only the solenoid 131 is energized. The oil pressure from the oil passage 103a passes through the oil passages 116, 117 and 181 to actuate the front clutch 200. On the other hand, the oil passage 117 communicates with the oil passages 128 and 182, and is thus also communicated to the oil chamber 211 of the front brake means 210 to actuate same. Since the front clutch 200 and front brake 210 are actuated, the second speed condition is obtained.

D Range 3rd Operation Condition:

The solenoids are all de-energized. The oil pressure from the oil passage 103a is transmitted through the oil passages 117, 128, and 182 to the oil chamber 211 of the front brake 210. On the other hand, the oil passage 128 communicates with the oil passages 136, 183 and 184 and ultimately to the coil chamber 212 of the front brake 210. Therefore, the same oil pressure is applied to the oil chambers 211 and 212 of the front brake 210. However, due to the difference in the effective cross sectional area of the piston facing the oil chambers 207 and 212 (the area facing the oil chamber 211 is smaller than that facing the oil chamber 212), the piston is moved leftward, thus releasing the front brake 210. The oil passage 183 also communicates with the oil passage 185 and, therefore, the rear clutch 220 is also actuated. Thus, by actuating the front clutch 200 and the rear clutch 220, the third speed operation condition is obtained.

N Range:

Only the solenoid 111 is energized. The oil pressure in the oil passage 103a is transmitted through the oil passages 116 and 115 and applied to the oil passages 127 and 126. However, the oil passage 127 is blocked by the 2–3 speed shift valve. The oil passage 126 communicates with the oil passage 135 which in turn communicates with the oil chamber 151 of the low coast pressure modifying valve mechanism 150. In this condition, no clutch or brake is actuated and the neutral condition is therefore established.

L Range 2nd Operating Condition:

Since this condition is identical to D Range 2nd operating condition, explanations will be omitted.

L Range 1st Operating Condition:

The solenoids 121 and 131 are energized. In this condition, the solenoid 131 is additionally energized when it is in the D range 1st speed condition. Furthermore, the oil pressure 127 which has been blocked by the 2–3 speed shift valve in the D range condition communicates with the oil passage 133. In the beginning period of the operation, since the valve 150a is urged leftward by the spring 150b, the oil passages 133 and 153 communicate with each other. When pressure is being established in the oil passage 153, said pressure is applied to the oil chamber 154 through an orifice passage 150c provided in the valve 150a. Thus the valve 150a is urged rightward by the oil pressure in the oil chamber 154, thus intercepting communication between the oil passages 133 and 153, thereby preventing a rise in pressure in the oil passage 153 or the actuation pressure of the rear brake 230. If the pressure in the oil passage 153 and the oil chamber 154 still remains high, the valve 150a moves further rightward until finally the oil passage 153 is communicated to an oil exhaust passage 152, thereby lowering the pressure in the oil passage 153. If the pressure in the oil passage 153 has lowered too much, the force applied by the pressure in the oil chamber to urge the valve 150a rightward becomes weaker than the force applied by the spring 150b to urge the valve 150a leftward and, therefore, the oil passage 133 is again communicated to the oil passage 153 thereby raising the pressure in the oil passage 153. According to the above processes, in the L range 1st speed condition, the front clutch 200 is actuated and, at the same time, the rear brake 230 is actuated at a constant oil pressure.

The solenoids 111 and 131 are energized. The oil pressure from the oil passage 103a is transmitted through the oil passage 155 to the oil passages 126 and 127. The oil passage 126 communicates with the oil passages 136 and 183 so that the oil pressure is applied to the oil chamber 212 of the front brake 210 by way of the oil passage 184 to release the front brake 210. Furthermore, since the oil passage 183 communicates with the oil passage 185 which leads to the rear clutch 220, the rear clutch is actuated. The oil passage 126 communicates with the oil passage 135 and supplies its hydraulic pressure to the oil chamber 151 of the low coast pressure modifying mechanism 150. Thus, the low coast pressure modifying valve 150a is moved leftward to open the oil passages 133 and 153, whereby the pressure modifying function of the valve is lost. On the other hand, the oil passage 127 communicates with the oil passage 133 and, since the pressure modifying function of the low coast pressure modifying valve mechanism 150 is lost, the oil pressure from the oil passage 133 is transmitted to the oil passage 153 with no reduction in pressure, and the oil pressure is then supplied to the rear brake 230 by way of the oil passage 186 to operate the rear brake. Thus, in R range, the rear clutch 220 and the rear brake 230 are actuated.

Parking Operation:

The oil passage 116e is constantly supplied with the oil pressure from the hydraulic pressure source by way of the oil passages 103a, 116a, 116b and 116c. The parking shift valve mechanism 160 is urged rightward by the spring 160c to take the position shown by 160b in all operating conditions except "P" range. Therefore, in any operating condition other than P range, the oil pressure supplied from the oil passage 116e is transmitted through the oil passages 162 and 163 and supplied to the oil chamber 172 of the parking piston mechanism 170. Thus, the parking piston 173 and the rod 176 are kept in the rightward urged condition. Now, if an instruction of P is despatched from the computing circuit, the solenoids 111 and 121 are energized. Then, the oil pressure from the oil passage 103a is transmitted through the oil passages 116, 115 and further through the oil passages 126 and 125. The oil passage 126 is blocked by the 2–3 speed shift valve, while the oil passage 125 communicates with the oil passages 166 and 161. The oil pressure supplied from the oil passage 161 urges the parking shift valve 160 leftward against the force of the spring 160c and thus makes the oil passages 166 communicate with the oil passage 165 to lead the oil pressure to the oil chamber 171. Since the oil chamber 172 is connected with the oil exhaust port 164 by way of the oil passage 163, the parking piston 173 and the piston rod 176 can move leftward. From the foregoing, it will be understood that the piston rod 176 is moved leftward in the parking condition while the rod is moved rightward in other operating conditions. Therefore, this reciprocating movement of the piston rod may be utilized to operate a proper bell crank rod thereby to actuate or release any required parking mechanism. By empbying a parking detent mechanism 240 made of a spring and ball, the parking mechanism can be held in its operating condition even when the oil pressure has failed.

The operation of the transmission and the hydraulic circuit as explained above is controlled by an electric controlling system as explained hereinunder.

Figure 4:
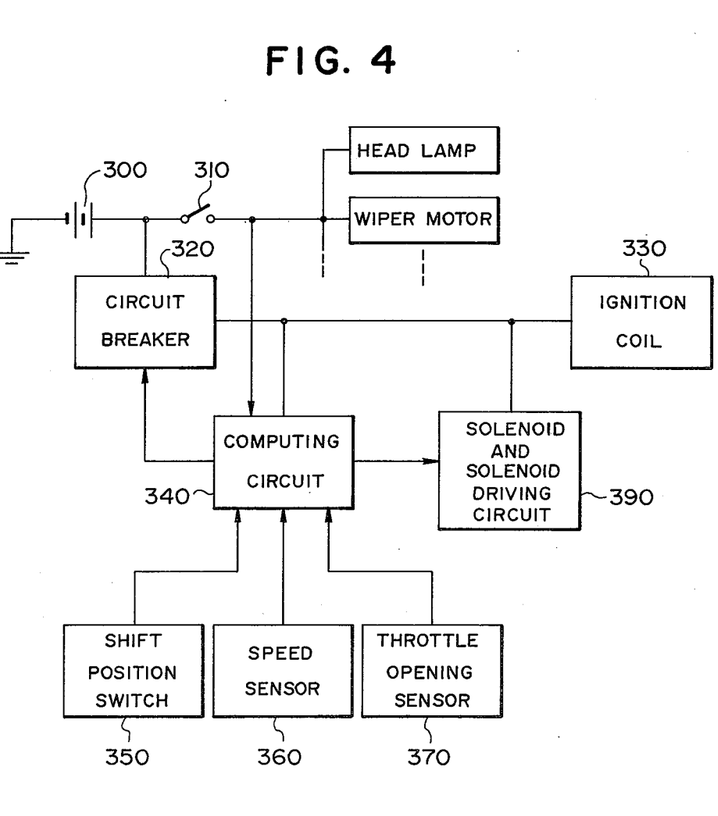
FIGS. 4–10 are diagrams showing an embodiment of the computing circuit incorporated in the automatic transmission device according to this invention; and, FIG. 11 is a view showing an arrangement of electric switches for operating the automatic transmission system according to this invention.

FIG. 4 is a block diagram showing the overall constitution of the electric controlling circuit. In FIG. 4, 300 is a battery for the automobile and 310 is an engine key switch. 320 is a circuit breaker which controls the electric current not laid under the control of the key switch 310 to supply such an electric current to an ignition coil 330, a computing circuit 340 and a solenoid driving circuit 390. 350, 360 and 370 are input signal sources required for the computing circuit, wherein 350 is a shift position switch with which the driver can select an operating mode, and 360 and 370 are wheel speed sensor and an engine throttle valve opening sensor, respectively, the latter two input sources being principally used to determine the shift position of the transmission in the forward running.

In FIG. 4, the thick lines are power lines for transmitting electric power while the thin lines are signal lines to trnasmit signals.

A detailed description of the embodiments of each constitution will be explained hereinunder.

Figure 5:
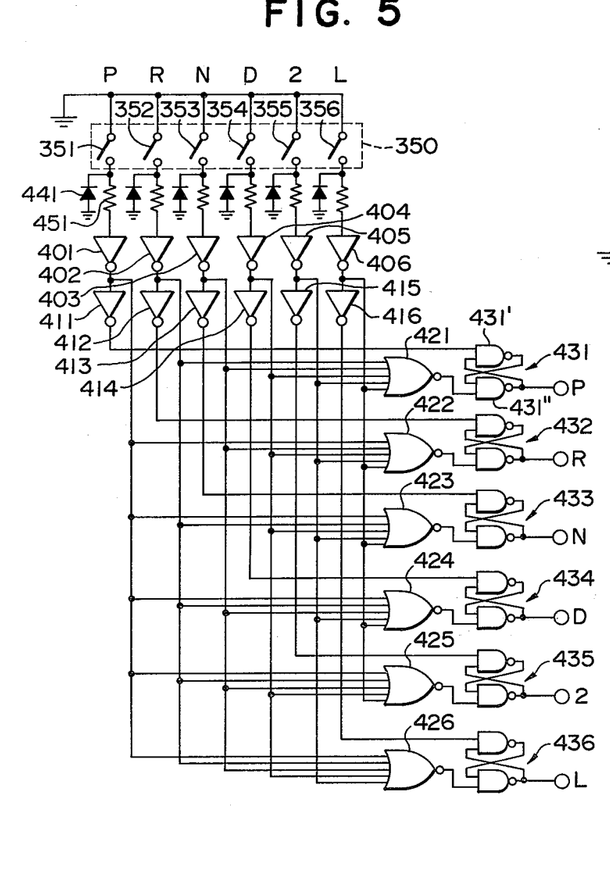
Figure 11:
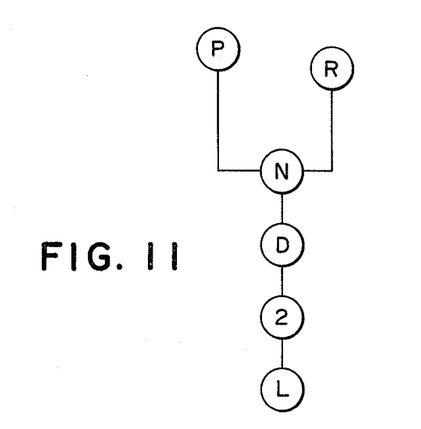

FIG. 5 shows the shift position switch 350 and a circuit for treating signals obtained from the shift position switch. The shift position 350 corresponds to a shift lever for the shifting of a manual valve in the conventional automatic transmission system but, in this case, it is an electric switch including a plurality of electric contact circuits. Since such an electric switch is not connected to the transmission by a mechanical linkage, it can be designed with a wide option for its mounting position, structure, design, etc. For example, the shift position switch may have shifting position arrangements as shown in FIG. 11. In this arrangement, the reverse position R is located up and rightward of the neutral position N, while the parking position P is located up and leftward of the position N, D-2-L-R being located straight below the position N. By such an arrangement, an incorrect shifting from a forward running condition to a P or R can be avoided and, in addition, there can be avoided such an inconvenience that in the conventional straight arrangement of P-R-N-D-2-L, the shifting to P has necessarily to pass R or the release shifting from P has also necessarily to pass R regardless of the driver's will. The switch 350 in FIG. 5 is composed of 6 electric contact circuits 351–356, the 6 contacts being adapted not to be simultaneously closed beyond one contact. The six contacts operate as follows. The contact 351 is for P positioning to be operated by the driver when he stops the automobile and leaves it so as to actuate the parking gear to prevent the automobile moving by itself. The contact 352 is for "R" positioning for reversing the automobile. The contact 353 is for "N" positioning or neutral positioning. The contacts 354, 355 and 356 are for the forward positioning wherein the contact 354 is for "D" positioning which allows automatic shifting of the transmission among its first, second and third speeds according to the running speed of the automobile, the contact 355 being for "2" positioning which allows shifting among first, second and third speed in the same manner as above, and the contact 356 being for "L" positioning to obtain a strong engine braking effect. The driver can select any of said six positions by selectively actuating one of the contacts of the switch 350.

FIG. 5 shows a condition where the shift position switch is set at the P position and the following is an explanation of such an operating condition. However, it will be noted that the system operates in the same manner when it is set at any other position. One terminal of each of the contacts 351–356 is grounded, while the other terminals are introduced into the input side of inverters 401–406 by way of diodes 441 and resistances 451. The symbols employed in the accompanying drawing to show the logic computing elements are those conventionally know, wherein an inverter is an element which gives an output of "Lo" level when its input is on "Hi" level and gives an output of Hi level when its input is on Lo level. In the present case, Lo level is the ground level and Hi level is a positive potential. In the case of the logic computing symbols however, it is common to omit the showing of an electric power source and the ground. Elements 421–426 are NOR which is a logic element which gives an output of Hi level only when all of its plural inputs are on Lo level, and gives an output of Lo level if even one of its plural inputs is on Hi level. Elements 431', 432'' are NAND which is a logic element which gives an output of Lo level only when all of its plural inputs are on Hi level, and gives an output of Hi level if even one of its plural inputs is on Lo level. The aforementioned diode 441 and resistance 451 are provided for the purpose of protecting said inverter which is made of semi-conductor integral circuits from external noises and, therefore, they are not directly related to the gist of this invention.

Now, since the contact 351 is enclosed, the output of the inverter 401 is on Hi level and the output of the inverter 411 connected to the inverter 401 is on Lo level. The output of the inverter 411 is connected to the input side of NAND 431' of a flip-flop composed of NAND 431', 431''. Since the contacts 352–356 are all opened and connected to the inverters 402–406, the outputs of these inverters are all on Lo level. Since the outputs of the inverters 402–406 are supplied as inputs to NOR 421, the output of NOR 421 is on Hi level, this output being supplied to an input side of NAND 431'' constituting the flip-flop 431. Therefore, the flip-flop gives an output of Lo level at an output terminal P of NAND 431'' and holds this condition until NOR 421 gives an output of Lo level.

In the same manner it will be understood from FIG. 5 that when the contact 352 has been closed, output terminal R of a flip-flop 432 is held on Lo level. In such a manner, the contact 353 corresponds to output terminal N, contact 354 to D, contact 355 to 2, and contact 356 to L.

Figure 6:
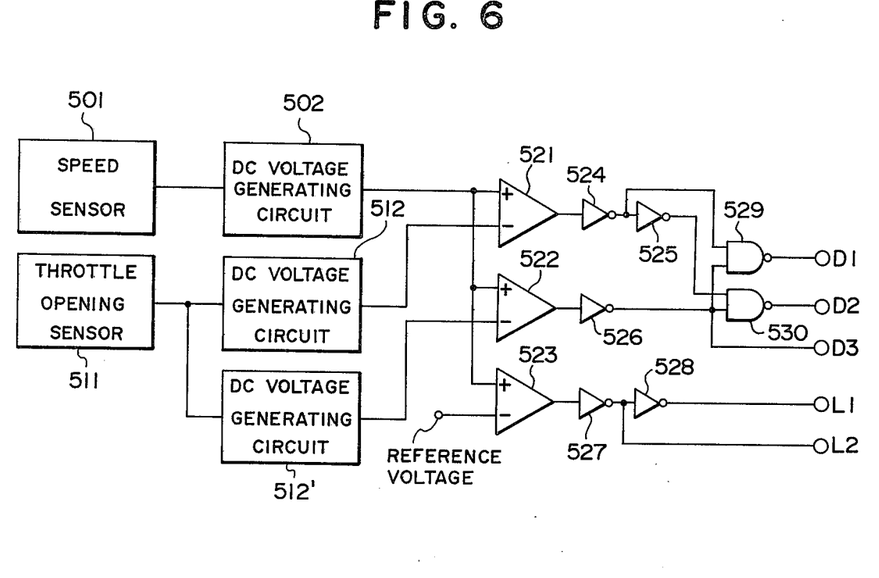

FIG. 6 shows a transmission computing circuit to determine the gear shifting ranges for the operation of the transmission. In order to select the gear shifting position of the transmission, the engine loading condition and the automobile running condition need to be known. As a substitute characteristic of the former condition, the throttle valve opening of the carbureter can be used, while as a substitute characteristic of the latter condition, the rotational speed of the driving wheel (vehicle speed) can be used. 501 is a speed sensor to detect the vehicle speed and may be such a device to detect the rotational speed of the output shaft of the transmission by an electro-magnetic pickup. 511 is a throttle opening sensor which may be a position sensing switch linked with a throttle link connecting the carbureter and the accelerator pedal. 502 is a DC voltage generating circuit to generate DC voltage in linear relation to the vehicle speed according to the amount detected by the speed sensor 501, such a DC voltage being conveniently processed in the computing circuit as described hereinunder. 512 and 512' are also DC voltage generating circuits to convert the amount detected by the throttle opening sensor 511 into DC voltage for the convenience of the electric computing process as described hereinunder. Some examples of said sensors are described as shown in the aforementioned Japanese patent publication 211/73.

521, 522 and 523 are voltage comparators, for example, μPC71 made by Nippon Denki Company, SN2710N by TI Company, etc., which give positive voltage output when the input voltage supplied to (+) input terminal is higher than the input voltage supplied to (−) input terminal, and gives a negative voltage output when the relation between the two input voltages is reversed. In this condition, although positive and negative electric power sources are required to operate such a voltage comparator, such sources are omitted in the drawing.

So, assuming that the DC voltages generated by the DC generating circuit 512 and 512' are higher than the DC voltages generated by the DC voltage generating circuit 502, or in other words, the vehicle running speed is very low, the output of the voltage comparators 521 and 522 are both negative or on Lo level. The output 521 becomes an input of NAND 530 by way of the inverters 524 and 525, and the output of the inverter 524 also becomes an input of NAND 529. The output of 522 becomes the input for NAND 529 and 530 by way of the inverter 526 and, therefore, only the output of NAND 529 becomes Lo level. Thus only terminal D1 becomes Lo level, while terminals D2 and D3 are on Hi level. By setting the DC voltage generating circuit 502 so that its output voltage becomes higher according to vehicle running speed as well as setting the DC voltage generating circuits 512 and 512' so that the output voltage of the former is higher than the latter, there is obtained an operation which switches terminals D1, D2 and D3 successively to Lo level by means of NAND 529 and 530 computing logically the output of the two voltage comparators 521 and 522, so that at any time either one of said terminals shows Lo level. By properly setting the DC voltage generating circuits 502, 512 and 512' so that optimum shifting ranges are obtained in relation to the engine loading and automobile running conditions, proper selections among 1st speed, 2nd speed and 3rd speed are effected for the transmission in response to the Lo level output of the terminals D1, D2 and D3. A voltage comperator 523 operates in the same way as the voltage comparators 521 and 522 except that in the former, the voltage to be compared with the vehicle running speed voltage is a constant voltage regardless of the throttle opening. Therefore, below a predetermined vehicle running speed, the terminal L1 becomes Lo level by means of the inverters 527 and 528, while above said vehicle speed, the terminal L2 becomes Lo level, thus determining particular transmission regions separately from those due to the terminals D1, D2 and D3.

For those switching over the voltage comparators 521 522 and 523, it is necessary to provide a hysteresis. However, such a constitution will be omitted here since it is not the gist of this invention and, it is suggested to refer to the aforementioned Japanese patent publication 211/73 for details thereof.

Figure 7:
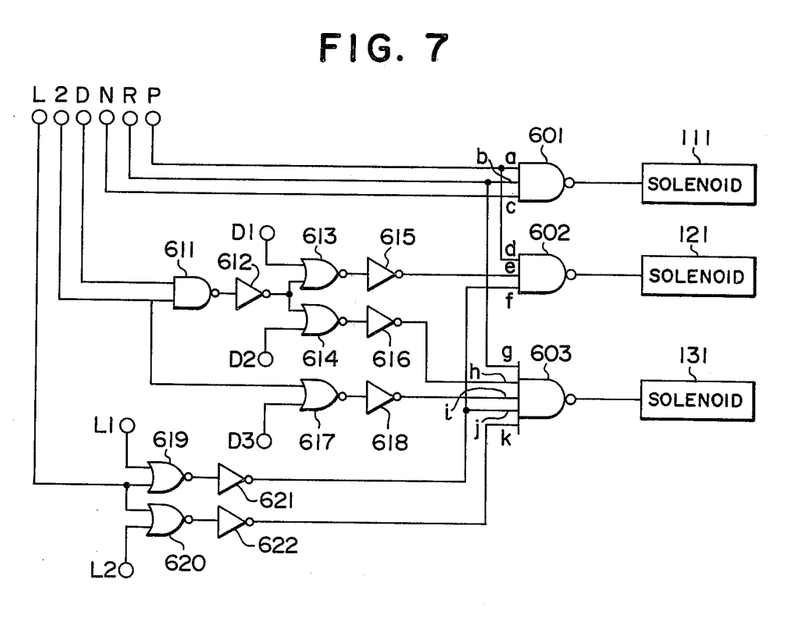

FIG. 7 shows a logic circuit to determine the actuating combination of the three solenoids 111, 121 and 131 to attain a required gear positioning. In FIG. 7, terminals P, R, N, D, 2 and L as well as D1, D2, D3, L1 and L2 are the same as shown in FIGS. 5 and 6 and generate Hi or Lo level as explained above. 601 is a three input NAND having three terminals $a$, $b$ and $c$, the output terminal thereof being connected to the solenoid 111. The solenoid 111 in FIG. 7 is the same solenoid as shown in FIG. 3$b$ and, in fact, an amplifier between NAND 601 and the solenoid 111 is provided to amplify the signal from NAND 601. However, such an amplifier is omitted from the explanations of the electric circuit shown in FIG. 7 and the subsequent figures. In the following, the solenoid 111 is conditioned to actuate when Hi level is supplied to its input terminal, and solenoids 121 and 131 are also conditioned to operate in the same manner. Input terminal $a$ of the NAND 601 is connected with terminal P, input terminal $b$ with terminal R and input terminal $c$ with terminal N, so that any of said three terminals becomes Lo level and the NAND output becomes Hi level to actuate the solenoid 111. The terminals D and 2 are connected to the input side of a two-input NAND 611, the output from which is supplied to each of the input terminals of the two-input NOR 613 and 614 after they have been reversed by an inverter 612. Another input terminal of NOR 613 is connected to terminal D1, while the output of said NOR is reversed by an inverter 615. Similarly, another input terminal of NOR 614 is connected to terminal D2, and the output of said NOR is reversed by an inverter 616. 617 is a two-input NOR supplied with input signals from terminals 2 and D3, its output being connected to an inverter 618. 619 and 620 are also two-input NOR which input terminals are connected with terminals L, L1 and L2 respectively. 602 is a three-input NAND having three input terminals $d$, $e$ and $f$ each being connected to terminal P, inverter 615 and inverter 621, respectively, while its output is supplied to the solenoid 121. 603 is a five-input NAND having input terminals $g$, $h$, $i$, $j$, and $k$, each being connected to terminal R inverter 616, inverter 618, inverter 621 and inverter 622 respectively, while its output terminal is connected to the solenoid 131. According to the aforementioned connections, NAND 601, 602 and 603 deliver Hi level when the input terminals $a$–$k$ are on Lo level. The following table gives such input conditions.

er's absence and, on such an occasion, the driver does not always select the parking shift position before stopping the engine but sometimes stops the engine and then selects the parking shift position. In the latter case, since the engine has stopped and the oil pump is not being driven when the driver selects the parking position, the parking operation is not in fact performed. Since it is unreasonable to expect a driver to keep to the correct order in his shifting operation, it is necessary that the parking operation, when actuated, be completed before the engine stops.

Figure 8:
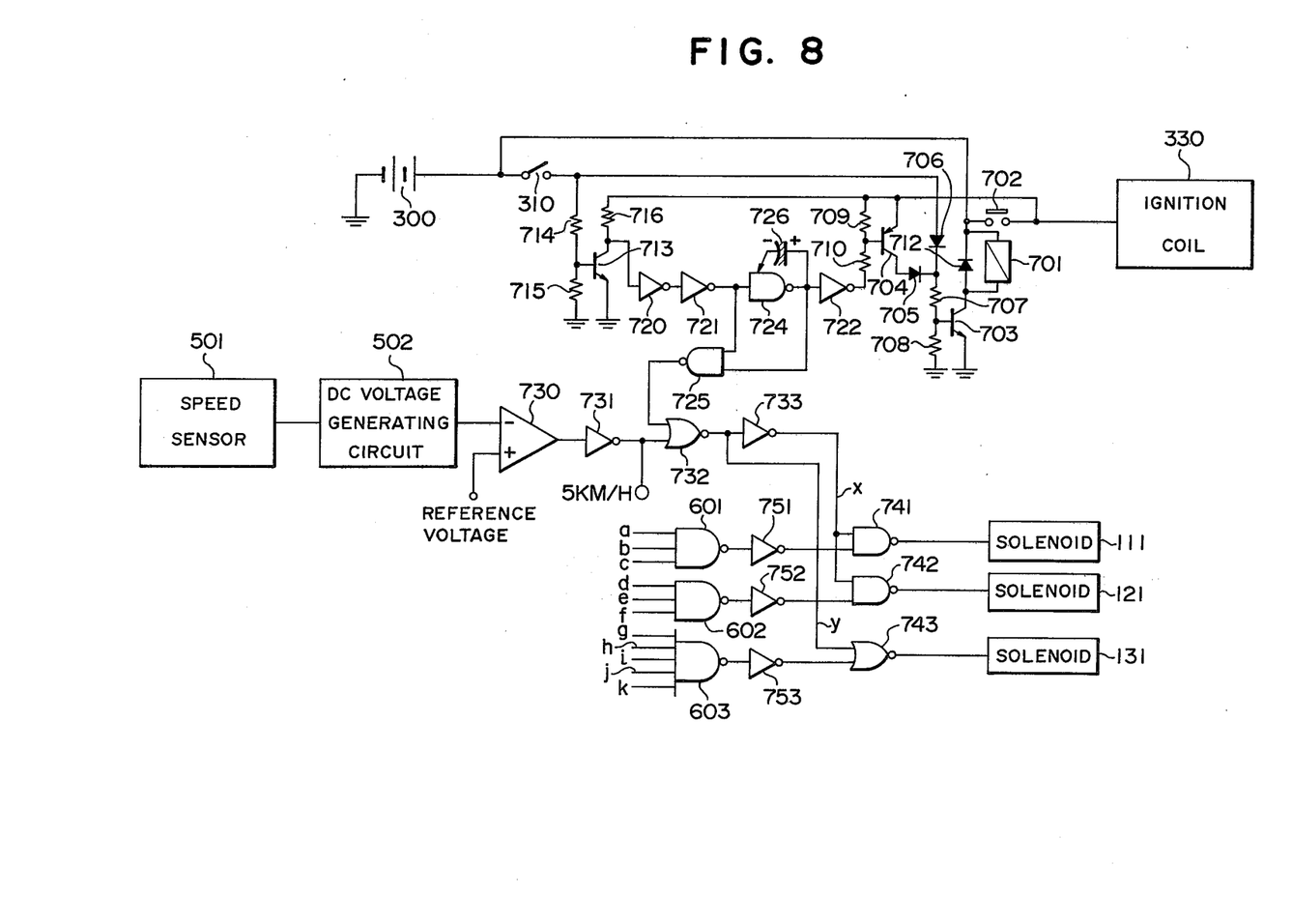

For this purpose, the constitution shown in FIG. 8 is adapted so that if the engine key switch is turned OFF while the automobile is running at a speed below, say 5Km/h, the parking solenoid mode (solenoids 111 and 121 are ON, while solenoid 131 is OFF) is automatically selected regardless of the shifting position and, in addition, the engine is kept running during a predetermined time necessary to complete the parking operation.

In FIG. 8, the ignition coil 330 is connected to the battery 300 by way of a contact 702 operated by a coil 701. The contact 702 is closed when the coil 701 is energized. A terminal of the engine key switch 310 opposite to that connected to the battery is connected to bias resistances 714, 715 for a transistor 713 as well as to bias resistances 707, 708 for a transistor 703 by way of a diode 706. The collector of the transistor 703 is connected to the relay coil. A diode 712 is a protecting diode to absorb surge. The collector of the transistor 713 is connected to a terminal of the relay contact 702 opposite to the electric source side by way of a collector resistance 716 to deliver output of Hi level when the key switch is OFF while it delivers output of Lo level when the key switch is ON. The output terminal of the transistor 713 is connected to an input terminal of a two-input NAND 725 and to the input terminal of an expandable NAND 724 by way of two inverters 720 and 721. The expandable NAND 724 means a NAND having an input terminal not including a diode for a gate therein, such as model TD1071P available from Tokyo Shibaura Company. The output terminal of NAND 724 and another intput terminal of the ex-

| Shift Position | Gear Position | Solenoid 111 | Solenoid 121 | Solenoid 131 |
|---|---|---|---|---|
| P | — | ON | ON | OFF |
| R | — | ON | OFF | ON |
| N | — | ON | OFF | OFF |
| D | 1st | OFF | ON | OFF |
| D | 2nd | OFF | OFF | ON |
| D | 3rd | OFF | OFF | OFF |
| 2 | 1st | OFF | ON | OFF |
| 2 | 2nd | OFF | OFF | ON |
| L | 1st | OFF | ON | ON |
| L | 2nd | OFF | OFF | ON |

FIG. 8 shows an embodiment of an electric control circuit to operate the parking gear mechanism. To obtain the parking condition, it is electrically required that the solenoids 111 and 121 are turned ON and the solenoid 131 is turned OFF. Furthermore, it is necessary that the line pressure is established in the hydraulic circuit of the transmission. Therefore, the source of the line pressure or the oil pump must be kept in operation until the parking operation is finished which in turn means that the engine must be kept running until such time. However, the parking brake is generally actuated to prevent the automobile moving by itself in the drivpander are connected to a condenser 726, and further, the output terminal of NAND 724 is supplied to NAND 725 and an inverter 722. The output terminal of the inverter 722 is connected to bias resistances 709, 710 for a transistor 704. The collector of the transistor 704 is connected to the cathode of the diode 705.

The aforementioned circuit operates as follows. Firstly, if the keyswitch 310 is turned ON, a current flows through the diode 706 to the base of the transistor 703 to turn on the transistor, whereby the relay coil 701 is energized, the contact 702 is closed, and the ignition coil 330 is energized. Simultaneously, the base of the transistor 713 is supplied with current through the resistance 714, whereby the transistor is turned on and the collector of the transistor becomes Lo level. Such a potential is applied to NAND 724 by way of the two inverters 720, 721 and, therefore, the output of said NAND becomes Hi level after a while and, in accordance therewith, the inverter 722 delivers Lo level output to absorb the base current of the transistor 704 by way of the resistance 710. In this condition, the condenser 726 is charged in the shown polarity. The output of NAND 725 is on Hi level.

Next, when the key switch 310 is turned OFF, the base current for the transistor 703 is cut off. Since the transistor 713 is turned off, the input terminal of NAND 724 becomes Hi level. However, since the output terminal of said NAND is kept on Hi level until the charge of the condenser 726 has been discharged, the inverter 722 still continues to absorb the base current of the transistor 704, and thus continues to supply the base current of the transistor 703 by way of the transistor 704 and the diode 705 thereby maintaining energization of the relay coil 701. Summarizing, when the driver has turned the key switch ON, the ignition circuit is supplied with current and operates, however, even when the key switch has been turned OFF, the ignition circuit is still supplied with current for a predetermined period, for example such as 1 second, to keep the engine operating for a predetermined period before it finally stops.

703 is a voltage comparator which operates in the same manner as the comparators 521–523 in FIG. 6 and compares the automobile speed voltage delivered by the DC voltage generating circuit 502 with a reference voltage. If the reference voltage is set at, for example, a value corresponding to vehicle speed 5 Km/h, the voltage comparator 703 delivers a negative voltage output when the automobile speed is higher than 5 Km/h and delivers a positive voltage output when the automobile speed is lower than said level. Such an output is reversed by an inverter 731 and, therefore, Hi level signal appears at terminal 5 KM/H when the automobile speed is higher than 5 Km/h, while Lo level signal appears at the terminal when the vehicle speed is below said level. A 2-input NOR 732 is supplied with input signals from NAND 725 and the inverter 731, and delivers its output to an input terminal of a two-input NOR 743 and to an inverter 733. The output of the inverter 733 is supplied to each one input terminal of two-input NANDS 741, 742. The output of NAND 741, 742 and NOR 743 are connected to the solenoid 111, 121 and 131, respectively, whereby each solenoid is driven when the corresponding gate output becomes Hi level. The elements 601–603 are the same ones shown in FIG. 7 which outputs are reversed by inverters 751, 752 and 753 and supplied to said gate means 741, 742 and 743 respectively.

In operation, if the automobile speed is higher than 5 Km/h, the output of NOR 732 is on Lo level and the output of the inverter 733 is on Hi level. Therefore, the output condition of the gate means 741, 742 and 743 is determined by the output of NAND 601, 602 and 603 which in turn are determined by their inputs a–k. Thus, the three solenoids operate according to the same condition as explained with reference to FIG. 7. If the vehicle speed is lower than 5 Km/h, the output of NAND 725 influences. In other words, if the key switch 310 is turned ON when the vehicle speed is below 5 Km/h, since the output of NAND 725 is on Hi level, the output of NOR 732 is on Lo level, and the output of inverter 733 becomes Hi level. This is the same as the aforementioned case where the vehicle speed is higher than 5 Km/h. However, if the key switch 310 is turned OFF, during a period such as one second, starting from that moment, NAND 725 delivers Lo level output and, thereafter, is switched over to deliver Hi level output. Therefore, during the aforementioned one second, NOR 732 delivers Hi level output and the inverter 733 delivers Lo level output, and accordingly, the gate means 741 and 742 deliver Hi level output while the gate means 743 delivers Lo level output regardless of the input conditions of a–k of NAND 601–603. Thus, the solenoid 111 and 121 are turned ON while the solenoid 131 is turned OFF to forcibly establish the parking condition and, since the engine is still driven to supply the line pressure by the oil pump, the parking operation is actually completed.

Figure 9:
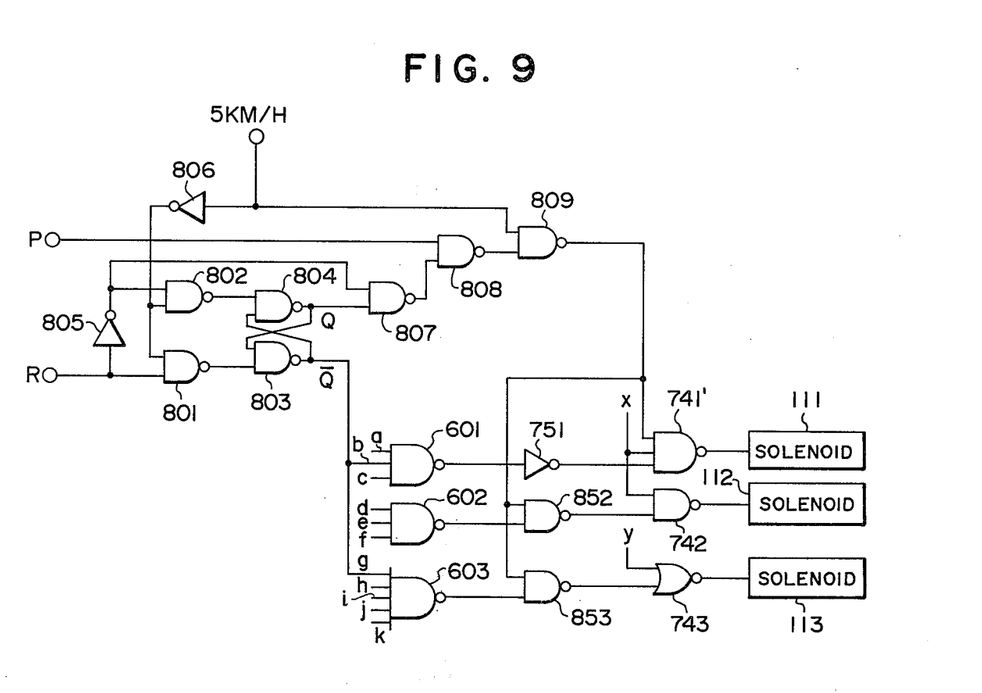

FIG. 9 shows a safety circuit to ensure protection when the shift position P or R has been selected by mistake while the vehicle is moving. It is very dangerous that the shift position P or R is selected by mistake when the vehicle is moving with, for example, shifting position D. To ensure protection against such a miss-shifting, it is possible to devise the structure of the shifting position selecting switch, thus mechanically preventing such a miss-shift operation. However, it is much safer to provide an electrical protection against such a miss-operation. Such a protection can be obtained by modifying the input b and g to NAND 601 and 603 as well as by replacing the inverters 752 and 753 by two-input NAND 852 and 853, respectively, and NAND 741 by a three-input NAND 741'. In FIG. 9, the circuit composed of NAND 801–804 is a latch circuit. An input terminal of NAND 801 is directly connected to terminal R while an input terminal of NAND 802 is connected to terminal R by way of an inverter 805 so that the input is reversed. The other input terminals of NAND 801 and 802 are connected to terminal 5 KM/H by way of an inverter 806. The output of NAND 801 and 802 are supplied to a flip-flop composed of NAND 803 and 804 and, therefore, the output of flip-flop $\bar{Q}$ becomes Lo level only when shift position R is selected when the vehicle speed is below 5 Km/h and, thereafter, keeps such an output level regardless of the vehicle speed until the selection to shift position R is ceased. If the shift position R is selected when the vehicle speed is about 5 Km/h, the output of flip-flop $\bar{Q}$ is held at Hi level. Since the output of flip-flop $\bar{Q}$ is connected to input b of NAND 601 and input g of NAND 603, it is limited to the case where R has been selected when the vehicle speed is below 5 Km/h that the solenoids are changed over to shift mode R, as it will be readily understood with reference to the explanations of FIG. 8. 807, 808 and 809 are two-input NAND. The input for NAND 807 is the output of the flip-flop Q and the input of the inverter 805. The output of Q is reversed to that of $\bar{Q}$ and, therefore, the output of NAND 808 becomes Lo level only when R is selected at vehicle speed below 5 Km/h. NAND 808 delivers Hi level either in the aforementioned condition or when shift position P is selected. Since such an output of NAND 808 is logically added when the signal of the vehicle speed 5 Km/h by NAND 809, the output of NAND 809 becomes Lo level only when P or R is selected at the vehicle speed below 5 Km/h. Since said Lo level signal is supplied to NAND 741', this signal has priority and thus, the output of NAND 741' becomes Hi level. Simultaneously, NAND 852 and 853 deliver Hi level signals and, therefore, the output of NOR 743 is on Lo level. Since the input x for NAND 742 is on Hi level when the vehicle speed if above 5 Km/h, its output is on Lo level. Thus the solenoid 111 is put ON while the solenoids 121 and 131 are put OFF, whereby the automatic transmission gear is forcibly shifted to the neutral condition.

Figure 10:
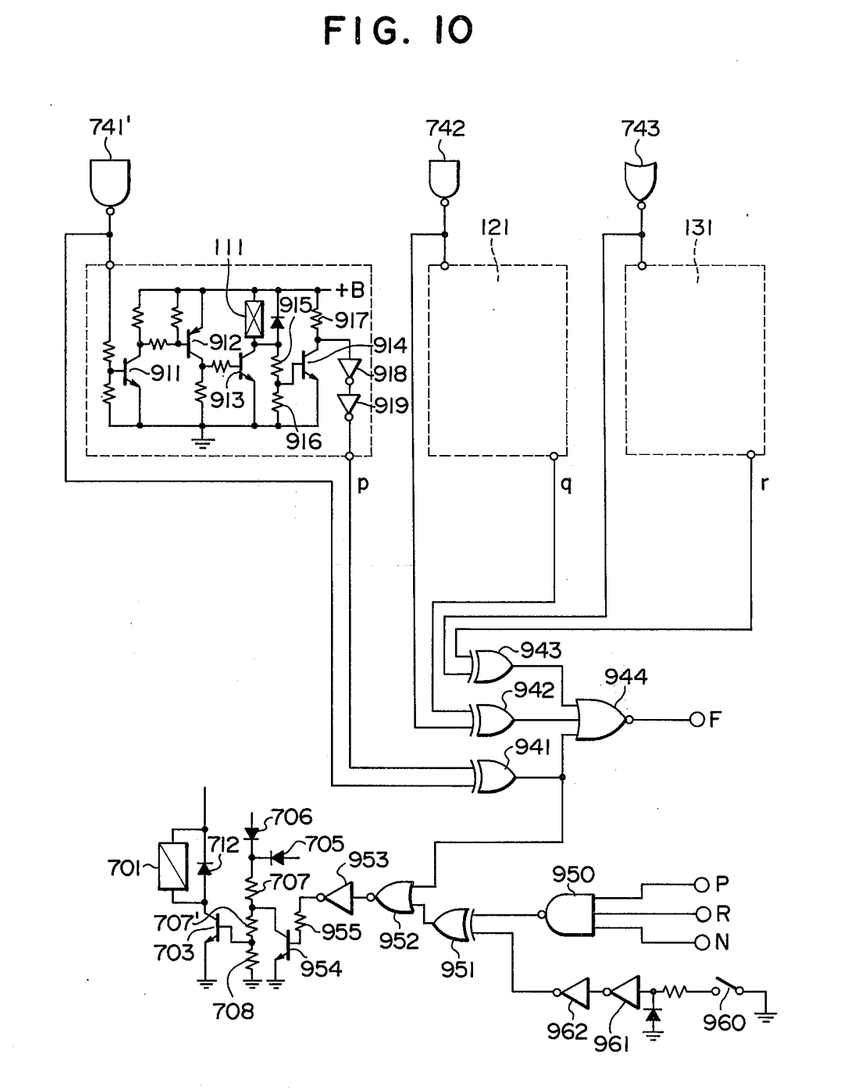

FIG. 10 shows another safety circuit. Even when the computing circuit such as shown in FIGS. 5–8 operates correctly, the expected operation of the transmission can not be obtained or a very hazardous condition will be brought about if the solenoids do not operate correctly according to the result of the computation. For example, it might happen that, despite the driver shifting to the forward position, the vehicle actually reverses. The safety circuit shown in FIG. 10 is adapted to generate a signal to actuate a warning mechanism if the solenoid does not operate correctly according to the result of the computation, and further to stop the engine automatically if the situation becomes hazardous.

The solenoid employed in the system according to this invention is generally designed to consume a current of the order of 2 amperes and a power transistor 913 to change over the solenoid is generally designed to have a capacity of about 5 amperes. To operate the power transistor 913, PNP transistor 912 and NPN transistor 911 are connected in its forestage as shown in FIG. 10 and the output of NAND 741' is supplied to the base of the transistor 911. The output of NAND 741' shows, as explained above, Hi level when the condition to drive the solenoid 111 has been established. In this instance, the transistors 911 and 912 are closed and, due to the biasing effect by the transistor 912, the power transistor 913 is closed, whereby the solenoid 111 connected to the collector of the power transistor 913 is energized the collector of the transistor 913 is connected with resistances 915 and 916 in series and the joint between said two resistances is connected to the base of a transistor 914. The collector of the transistor 914 is connected to a battery through a resistance 917 and also to inverters 918 and 919. Therefore, when the power transistor 913 is turned on, the transistor 914 is turned off and, in this instance, Hi level signal is delivered to the terminal p through the inverters 918 and 919. Since the same kind of driving circuit is incorporated for the solenoids 121 and 131, a detailed showing is omitted in FIG. 10 except terminals q and r corresponding to terminal p. 941, 942 and 943 are a two-input Exclusive OR gate which is an element which delivers Lo level output when its two inputs are both on Hi or Lo level and delivers Hi level output when its two inputs are different from each other. Such an element is known as MC1812F of the Motorola Company. Said OR gate 941 is supplied with input from NAND 741' and terminal p, the gate 942 from NAND 742 the terminal q and the gate 943 from NOR 743 and terminal r. The outputs of these gates are introduced into a three-input NOR 944. Therefore, if the computing circuit is despatching a signal to drive the solenoid and yet the solenoid is not energized or, reversely, if there is no signal to drive the solenoid and, nevertheless, the solenoid is energized, NAND 944 delivers Lo level signal.

It is easy to warn the driver by a warning light, a warning buzzer, etc., due to such a signal indicating a malfunction. However, it is very hazardous when the Exclusive OR gate 941 delivers Hi level signal. This means that even though the driver has shifted to the forward position, the transmission is in the reverse or parking position, or reversely, even though the driver has not shifted to the forward position, the transmission is in the the forward condition. In the event of such a malfunction, stopping the engine might be the best way of ensuring protection, rather than devising an electric control system for control on such an occasion.

As shown in FIG. 8, the supply of the electric power to the ignition circuit is controlled by the relay coil 701. In FIG. 10, the bias resistance for the transistor 703 to control the relay coil 701 is composed of resistances 707, 707' and 708 wherein the connecting point of the resistances 706 and 707' is connected to the collector of a transistor 954. The base of the transistor 954 is connected to the output terminal of an inverter 953 through a resistance 955. The input terminal of the inverter 953 is connected to the output terminal of a two-input NOR 952. One of the input terminals of said NOR is connected to the output terminal of the aforementioned Exclusive OR 941. In such a structure, when said OR 941 delivers Hi level output, the transistor 954 is turned on thereby turning off the transistor 703, thus intercepting supply of the electric power to the ignition circuit to stop the engine. Furthermore, a hazardous condition will be brought about if a malfunction occurs in the hydraulic circuit of the automobile transmission system even when its electric controlling circuit is operating normally. In such a case, some sticking of the shift valve, etc., might be caused so that, despite the signal from the electric controlling system being in the forward condition, the hydraulic circuit might build-up a circuit condition for reversing, or vice-versa. Such a malfunction can be detected by variations of the hydraulic pressure in the oil passage 115 in the hydraulic circuit shown in FIG. 3b. The oil passage 115 is put in the same pressure condition as the line pressure passage 103a when the solenoid 111 is energized and the shift valve 110 is shifted to the position shown by 110b. However, if the solenoid 111 is not energized, the shift valve 110 is in the position of 110a and the line pressure does not appear in the oil passage 115. The oil pressure switch 960 connected to the oil passage 115 is adapted to be opened when the line pressure exists in the oil passage 115 and closed when such a line pressure is not applied. As shown in FIG. 10, the operation signal of the oil pressure switch is supplied to one terminal of Exclusive OR 951 through inverters 961 and 962. The other input terminal of said OR 951 is supplied with the output of NAND 950 which produces logic addition of the signals of terminals P, R and N. If the oil pressure switch 960 is opened when either of the terminals P, R and N is on Lo level, the Exclusive OR 951 delivers Lo level output to indicate that the operation is performed normally, but if the two input signal levels are different from each other, said OR 951 delivers Hi level output whereby the transistor to cut off the ignition circuit is actuated to stop the engine.

From the foregoing explanations, it will be appreciated that this invention provides the following advantages:

1. Since the pilot pressure of all shifting valves is controlled by one or more solenoids, the structure of the shifting valves is simple, thereby excluding malfunctions.

2. Since all the shifting valves are changed over by means of the solenoids, the selection among the transmission regions such as forward, reverse, neutral and parking is effected by electric connections without requiring any mechanical linkage.

3. Since the shifting among the transmission regions is effected electrically so that a computing circuit despatches instructions, various kinds of safety devices and circuits can be easily incorporated into the computing circuit, whereby for example, the following safeguard operations can be performed:

a. even when a shifting is made by mistake to L range when the automobile is running at high speed, the shifting to first speed is not actually effected until the automobile speed is reduced to a predetermined level.

b. even if a shifting is made by mistake to P range when the automobile is running, the parking function is not actuated until the automobile speed is reduced to a predetermined level.

c. if the shift gear is shifted to reverse by mistake when the automobile is running forward, or to forward when the automobile is reversing, the engine is automatically stopped.

d. in the case of parking the automobile, if the engine is stopped in any range condition other than the parking, the solenoid energizing for P is automatically attained and, simultaneously, the engine operation is held for a predetermined period such as one second to drive the oil pump to complete the parking condition.

4. Since the vehicle speed is detected electrically, its precision is high.

5. Since the throttle opening is detected electrically, its precision is high.

6. Since the shifting points are determined electrically, the precision in the shifting is high.

7. Since the shifting points are determined electrically, their settings are easily done at any shifting point available.

8. By providing a pressure adjusting valve in the rear brake circuit, a shock free shifting from second speed to first speed can be done when the transmission region is set in L.

We claim:

1. An automatic transmission system for use with automobiles comprising a gear wheel transmission mechanism, a plurality of hydraulically operable engaging means to accomplish transmission meshings in said gear wheel transmission mechanism, a parking mechanism, a hydraulically operable parking actuating means to actuate said parking mechanism, hydraulic pressure shift valve means operated by a plurality of solenoids to control the supply of hydraulic pressure to said engaging means and said parking actuating means, electric switches to be manually operated, means to generate signals regarding the vehicle running condition, and a computing circuit to control energization of said solenoids of said hydraulic pressure shift valve means in response to electric signals despatched from said electric switches and said signal generating means.

2. An automatic transmission system according to claim 1, wherein said parking actuating means includes a piston to actuate said parking mechanism, a hydraulic piston mechanism having first and second oil chambers, said first oil chamber being adapted to drive said piston to the position where said parking mechanism is actuated and said second chamber being adapted to drive said piston to the position where said parking mechnism is released, and a shift valve to supply hydraulic pressure to said first oil chamber in a first oil pressure supply condition of said oil pressure shift valve means determined by the energization condition of said solenoid and to supply oil pressure to said second oil chamber in the other hydraulic pressure supply condition.

3. An automatic transmission system according to claim 1, further comprising a switch to stop a prime mover to drive said transmission system, a timing means to operate in response to the actuation of said switch to stop said prime mover, and a parking condition establishing circuit to hold the operating condition of said prime mover during the operating period of said timing means and to set up such an energizing condition of said solenoids that establishes a shift condition of said hydraulic pressure shift valve means determined for the parking condition.

4. An automatic transmission system according to claim 1, further comprising a circuit to detect the energizing condition of said solenoids, and a safety circuit to compare the signals from said detecting circuit and said computing circuit to despatch a signal when there is an inconsistancy between said two signals and to ensure protection.

5. An automatic transmission system according to claim 2, further comprising a detent mechanism to keep said parking mechanism at its actuating position even when the hydraulic pressure supplied to said parking actuating means has failed.

* * * * *